US011195178B2

(12) United States Patent
Sadeddin et al.

(10) Patent No.: US 11,195,178 B2
(45) Date of Patent: Dec. 7, 2021

(54) INTEGRATING TRACKED TRANSACTION DATA INTO APPROVAL CHAINS FOR DIGITAL TRANSACTIONS

(71) Applicant: Coupa Software Incorporated, San Mateo, CA (US)

(72) Inventors: Ahmad Sadeddin, San Francisco, CA (US); Scott Harris, Menlo Park, CA (US)

(73) Assignee: Coupa Software Incorporated, San Mateo, CA (US)

( * ) Notice: Subject to any disclaimer, the term of this patent is extended or adjusted under 35 U.S.C. 154(b) by 115 days.

(21) Appl. No.: 15/921,570

(22) Filed: Mar. 14, 2018

(65) Prior Publication Data

US 2019/0287106 A1    Sep. 19, 2019

(51) Int. Cl.
*G06Q 20/40* (2012.01)
*G06Q 50/18* (2012.01)

(52) U.S. Cl.
CPC .......... *G06Q 20/401* (2013.01); *G06Q 50/18* (2013.01)

(58) Field of Classification Search
CPC ........ G06Q 20/04; G06Q 40/02; G06Q 20/10; G06Q 20/12; G06Q 20/24; G06Q 20/405; G06Q 20/1235; G06Q 20/40; G06Q 30/06; G06Q 40/08; G06Q 40/12; G06Q 20/02; G06Q 20/023; G06Q 20/14; G06Q 30/0601; G06Q 20/102; G06Q 20/105; G06Q 20/204; G06Q 30/04; G06Q 40/00; G06Q 10/0635; G06Q 10/08; G06Q 20/065; G06Q 20/20; G06Q 20/341; G06Q 20/3572; G06Q 30/0255; G06Q 40/025; G06Q 40/04; G06F 21/10; G06F 21/31; G06F 2211/007; G06F 2221/2101; G06F 2221/2135; G06F 21/33;
(Continued)

(56) References Cited

U.S. PATENT DOCUMENTS

| 2002/0095386 A1* | 7/2002 | Maritzen | G06Q 20/3572 |
| | | | 705/64 |
| 2003/0093585 A1* | 5/2003 | Allan | H04L 67/02 |
| | | | 719/330 |
| 2003/0139990 A1* | 7/2003 | Greco | G06Q 40/00 |
| | | | 705/35 |

(Continued)

*Primary Examiner* — Alexander G Kalinowski
*Assistant Examiner* — Sanjeev Malhotra
(74) *Attorney, Agent, or Firm* — Baker Botts L.L.P.

(57) ABSTRACT

Techniques for implementing conditional approval chains through a spend management system are described herein. In an embodiment, a spend management system stores data defining a plurality of conditional approval chains. The system receives a request to perform a particular transaction between a first account and a second account. The system identifies a particular conditional approval chain, of the plurality of conditional approval chains, for the transaction, the particular conditional approval chain comprising a particular condition based on a particular rating value for a particular account and a consequent comprising a requirement for approval from a third account. Using the particular rating value for the second account, the system computes a result of the particular conditional approval chain. Based on the computed result of the particular conditional approval chain, the system determines that the transaction requires approval from the third account and, in response, the system sends a request for approval of the transaction to a client computing device associated with the third account.

22 Claims, 6 Drawing Sheets

(58) Field of Classification Search
CPC ............ G06F 21/86; G06F 2221/0737; G06F
2221/0797; G06F 2221/2151; G06F
12/1408; G06F 12/1483; G06T 1/0021;
G07F 9/026; H04L 2209/56; H04L
2463/101; H04L 2463/102; H04L
2463/103; H04L 63/0823; H04L 63/20;
H04L 9/3263; H04L 12/1403; H04L
12/40104; H04L 12/40117; H04L
2209/60; H04L 2209/603; H04L 63/04;
H04L 63/068; H04L 63/10; H04L
63/1433; H04L 9/3218; H04N 21/2347;
H04N 21/23476; H04N 21/235; H04N
21/2362; H04N 21/2541; H04N 21/2543;
H04N 21/2547; H04N 21/25875; H04N
21/4143; H04N 21/4345; H04N 21/4405;
H04N 21/44204; H04N 21/443; H04N
21/4627; H04N 21/4753; H04N 21/6581;
H04N 21/835; H04N 21/8355; H04N
21/83555; H04N 21/8358; H04N 7/162;
H04N 7/17309; H04N 21/8166; Y04S
10/54; G11B 20/00086; G11B 20/00159;
G11B 20/00188; G11B 20/00557; G11B
20/0071; G11B 20/00768; G11B
2220/216; G11B 2220/218; G11B
2220/2562; G11B 2220/2575; G11B
27/031; G11B 27/329; H04M 15/44;
H04M 15/58; H04M 15/745; H04M
15/80; H04M 15/8011; H04M 15/8044;
H04M 15/805; H04M 15/8083; H04M
15/83; H04M 15/84; H04M 15/85; H04M
15/851; H04M 2215/0104; H04M
2215/0108; H04M 2215/018; H04M
2215/0184; H04M 2215/0188; H04M
2215/74; H04M 2215/7407; H04M
2215/745; H04M 2215/7457; H04M
2215/81; H04M 2215/8129; H04M
2215/815
USPC ............ 705/2, 4, 7.28, 14.11, 14.16, 14.25,
705/14.53, 17, 26.1, 26.82, 27.2, 30, 35,
705/36 R, 38, 39, 40, 41, 42, 44, 53, 57,
705/64; 707/797; 726/1, 4; 1/1;
348/207.1; 719/330
See application file for complete search history.

(56) References Cited

U.S. PATENT DOCUMENTS

| | | | | |
|---|---|---|---|---|
| 2003/0140007 A1* | 7/2003 | Kramer | G06Q 20/04 | 705/40 |
| 2003/0229582 A1* | 12/2003 | Sherman | G06Q 40/025 | 705/38 |
| 2004/0034596 A1* | 2/2004 | Light | G06Q 20/04 | 705/40 |
| 2004/0201679 A1* | 10/2004 | Carcia | H04N 1/0044 | 348/207.1 |
| 2005/0049892 A1* | 3/2005 | Miller | G06Q 10/0831 | 705/4 |
| 2005/0060584 A1* | 3/2005 | Ginter | H04N 21/8355 | 726/4 |
| 2008/0270240 A1* | 10/2008 | Chu | G06Q 30/0239 | 705/14.11 |
| 2009/0171805 A1* | 7/2009 | Gould | G06Q 30/0601 | 705/26.1 |
| 2009/0327041 A1* | 12/2009 | Flake | G06Q 99/00 | 705/14.16 |
| 2010/0010901 A1* | 1/2010 | Marshall | G06Q 20/20 | 705/17 |
| 2010/0174652 A1* | 7/2010 | Shear | G11B 20/0071 | 705/53 |
| 2010/0185488 A1* | 7/2010 | Hogan | H04L 12/14 | 705/30 |
| 2011/0047054 A1* | 2/2011 | Ginter | G06Q 20/10 | 705/30 |
| 2011/0087592 A1* | 4/2011 | van der Veen | G06Q 20/227 | 705/44 |
| 2011/0191209 A1* | 8/2011 | Gould | G06Q 30/0637 | 705/26.82 |
| 2012/0010936 A1* | 1/2012 | Satyavolu | H04M 15/00 | 705/14.25 |
| 2012/0150697 A1* | 6/2012 | Wade | G06Q 30/0643 | 705/27.2 |
| 2013/0013514 A1* | 1/2013 | Mackouse | G06Q 30/0601 | 705/44 |
| 2013/0041819 A1* | 2/2013 | Khasho | G06Q 40/02 | 705/42 |
| 2013/0054460 A1* | 2/2013 | Hanson | G06Q 40/02 | 705/44 |
| 2013/0117108 A1* | 5/2013 | Spears | G06Q 30/0255 | 705/14.53 |
| 2013/0159121 A1* | 6/2013 | May | G06Q 20/00 | 705/26.1 |
| 2013/0166600 A1* | 6/2013 | Snyder, II | G06F 16/2246 | 707/797 |
| 2013/0297376 A1* | 11/2013 | Miller | G06Q 10/08 | 705/7.28 |
| 2013/0304486 A1* | 11/2013 | Jagemann | G06Q 50/01 | 705/2 |
| 2014/0046847 A1* | 2/2014 | Jacobs | G06Q 20/405 | 705/44 |
| 2014/0136381 A1* | 5/2014 | Joseph | G06Q 40/02 | 705/35 |
| 2014/0172687 A1* | 6/2014 | Chirehdast | G06Q 40/00 | 705/38 |
| 2014/0258102 A1* | 9/2014 | Hirka | G06Q 20/20 | 705/39 |
| 2014/0258111 A1* | 9/2014 | Yoshikawa | G06Q 20/3224 | 705/41 |
| 2014/0380408 A1* | 12/2014 | Ginter | G06Q 20/023 | 726/1 |
| 2015/0006403 A1* | 1/2015 | Shear | H04L 9/0861 | 705/57 |
| 2015/0046307 A1* | 2/2015 | Calman | G06Q 20/12 | 705/35 |
| 2015/0154570 A1* | 6/2015 | Dheer | G06Q 20/24 | 705/44 |
| 2015/0178725 A1* | 6/2015 | Poetsch | G06Q 20/405 | 705/44 |
| 2015/0220923 A1* | 8/2015 | Vasant Akole | G06Q 20/405 | 705/44 |
| 2015/0348213 A1* | 12/2015 | Mohanty | G06Q 10/063 | 705/30 |
| 2015/0379488 A1* | 12/2015 | Ruff | G06Q 40/02 | 705/36 R |
| 2016/0012424 A1* | 1/2016 | Simon | G06Q 20/3674 | 705/67 |
| 2016/0055435 A1* | 2/2016 | Miller | H04L 63/1433 | 705/7.28 |
| 2016/0086222 A1* | 3/2016 | Kurapati | G06Q 30/0261 | 705/14.53 |
| 2016/0132860 A1* | 5/2016 | Ko | G06Q 20/3223 | 705/39 |
| 2016/0232526 A1* | 8/2016 | Vasant Akole | G06Q 20/405 | |
| 2016/0307081 A1* | 10/2016 | Wurmfeld | G07F 7/10 | |
| 2017/0032433 A1* | 2/2017 | Lawson | H04L 12/1403 | |
| 2017/0116647 A1* | 4/2017 | Hassan | G06Q 30/02 | |
| 2017/0193585 A1* | 7/2017 | Guo | G06F 16/9535 | |
| 2017/0286431 A1* | 10/2017 | Lijachev | G06F 16/95 | |
| 2017/0337287 A1* | 11/2017 | Gill | G06F 16/9537 | |
| 2018/0041345 A1* | 2/2018 | Maim | G06F 21/51 | |
| 2018/0101906 A1* | 4/2018 | Mcdonald | G06Q 20/204 | |
| 2019/0036778 A1* | 1/2019 | Bathen | H04L 41/0893 | |

* cited by examiner

FIG. 4

INTEGRATING TRACKED TRANSACTION DATA INTO APPROVAL CHAINS FOR DIGITAL TRANSACTIONS

FIELD OF THE DISCLOSURE

The present disclosure is in the technical field of configurable software platforms and platform interfaces. The disclosure also is in the technical field of transaction tracking between computing devices using workflows or mandatory approval sequences, and generation and execution of functional logic rules based on transaction data and/or for processing transaction data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Transaction facilitation software packages provide interfaces for facilitating transactions between computing devices. The transactions often include data identifying the computing devices involved in the transaction, a goal of the transaction, and transaction parameters. Facilitation of the transactions between the computing devices is often performed at a transaction system.

While transaction facilitation software packages can include access controls and user definitions for various users from a particular entity, such as a business, the software packages often only allow for binary choices in determining whether a user can perform a transaction. Users are either allowed to perform transactions on behalf of the entity or are barred from doing so. Any more complex determinations are usually performed offline by members within the entity. For instance, a manager may require employees to obtain approval from their supervisors before logging onto a computer to perform a transaction.

Requests for approval performed outside of the transaction system tend to be inefficient, contain security risks, and are unable to benefit from data stored by the facilitator of the transaction. Inefficiencies are introduced when transactions are either barred or allowed because additional software systems must be incorporated to perform more complex determinations or participants are required to use various different accounts and/or update account permissions to briefly allow performance of these transactions. Security risks may also be introduced when the final approval for performance of a transaction occurs separately from the facilitation of the transaction, as an approved user may continue to maintain the ability to perform transactions after completion of the approved transaction.

When requests for approval are performed separately from the transaction system, determinations as to approval of the transactions are unable to be based on data obtained through the transaction system which is capable of tracking transaction data. Data tracked by the transaction system from transactions between participants outside of the enterprise may be useful in determining whether to approve transactions and/or to seek approval for transactions. Yet this data is unable to be applied to requests for approval, as the data is only available through the transaction system.

Generally, requests for approval for transactions tend to be performed based on simplistic data, such as an identity of the user performing the transaction and the cost of the transaction. While such data may be useful in determining whether to require approval for a transaction, the data tends to be blind to the other participants to the transaction. Data regarding the other entities in the transaction may be extremely important in terms of determining whether approval is required for the transaction. For example, if a participant in the transaction has a bad transaction history with other participants, that data may be useful in determining whether the transaction needs approval by other parties. Yet participant data is often not leveraged in determining whether approval for a transaction is needed, nor can that data be leveraged by the enterprise without performing additional data requests.

Even when systems include the ability to block transactions or allow them, there is little opportunity for customizing the requirements for different implementations. For instance, one enterprise may be interested in third party ratings of the participant while another is interested in prior disputes. Additionally, different types of requirements may be useful for different types of transactions. For instance, approval requirements for contractual transactions may be heavily influenced by current judicial disputes while approval requirements for purchasing transactions may be heavily influenced by invoice disputes.

Thus, there is a need for a system which can implement a conditional approval chain at the transaction facilitator in order to utilize transaction data. Additionally, there is a need for a system which implements a graphical user interface for generating customized conditional approval chains based on the needs of an entity and/or a transaction type.

SUMMARY

The appended claims may serve to summarize the disclosure.

BRIEF DESCRIPTION OF THE DRAWINGS

In the drawings:

FIG. 4 depicts an example graphical user interface for creating a new approval chain.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections below according to the following outline:

General Overview
Structural Overview
Conditional Approval Chains
Conditions
Actions
Graphical User Interface
Benefits of Certain Embodiments
Implementation Example—Hardware Overview
General Overview Techniques for integrating transaction data into approval chains for digital transactions are described herein. According to an embodiment, a server computer stores data defining conditional approval chains. The conditional approval chains include conditions based on rating values for accounts in the transaction. During execution of a transaction, the server computer evaluates the conditional approval chain to determine whether the values for an account in the transaction satisfy the condition. Based on the evaluation of the approval chain, the server computer determines whether to allow the transaction to proceed or to automatically send data describing the transaction to another account for approval.

In an embodiment, a method comprises storing, at a spend management computer system, data defining a plurality of conditional approval chains, the spend management computer system being programmed to complete transactions that require approval according to the conditional approval chain only after requesting and obtaining approval from one or more user accounts that are specified in the data; receiving a request to execute a particular transaction between a first account and a second account; identifying a particular conditional approval chain, of the plurality of conditional approval chains, for the transaction, the particular conditional approval chain comprising a particular condition based on a particular rating value for a particular account and a consequent comprising a requirement for approval from a third account; each of the first account, second account, and third account being associated with different client computers; retrieving a particular rating value for the second account from records of the second account in digital storage; using the particular rating value for the second account, computing a result of the particular conditional approval chain; based on the computed result of the particular conditional approval chain, determining that the transaction requires approval from the third account and, in response, sending a request for approval of the transaction to the third account.

Structural Overview

Figure 1:
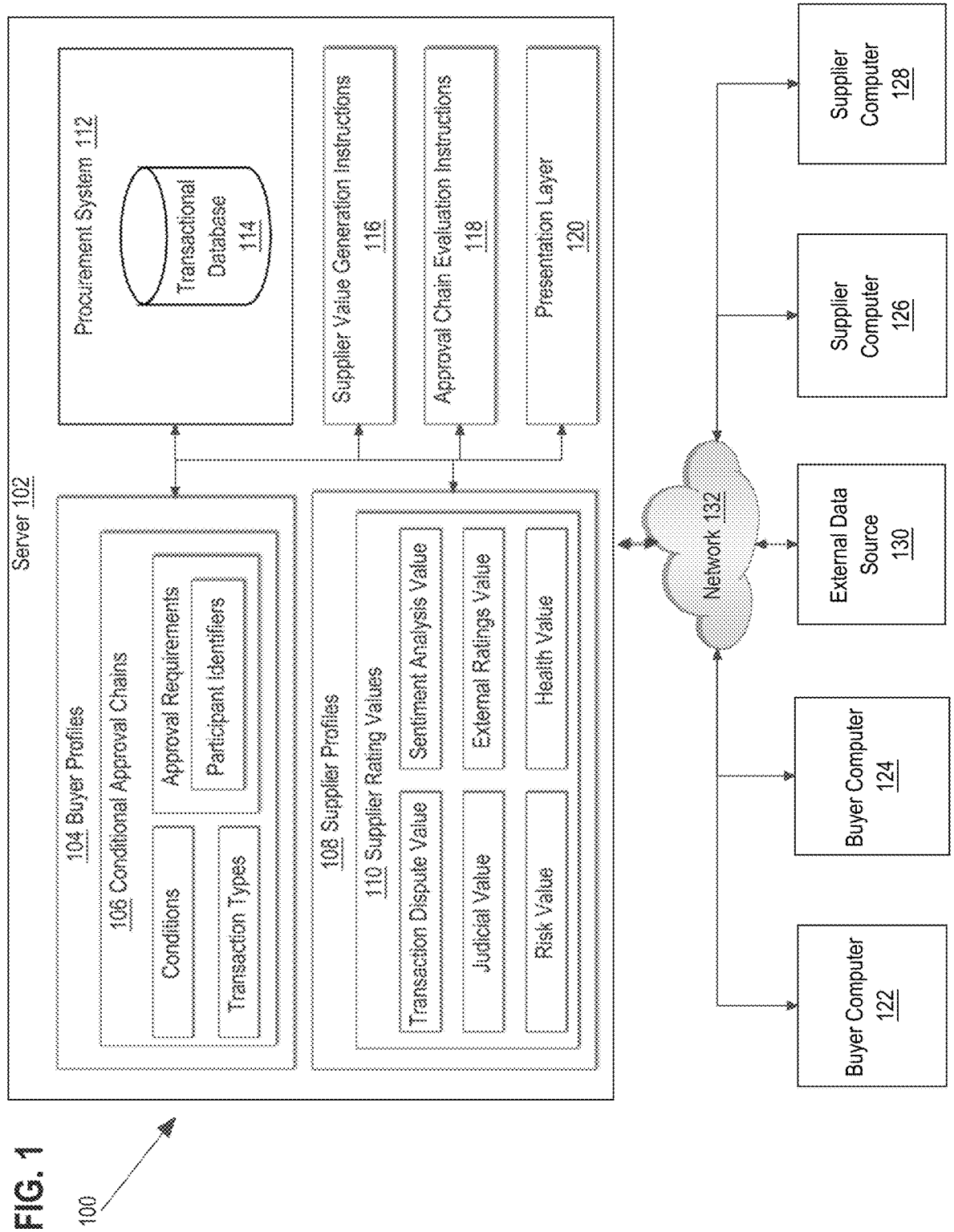
FIG. 1 is a block diagram of an example computer network system in which various embodiments may be practiced.

FIG. 1 is a block diagram of an example computer network system in which various embodiments may be practiced. FIG. 1 is shown in simplified, schematic format for purposes of illustrating a clear example and other embodiments may include other elements.

In an embodiment, a networked computer system 100 comprises a server computer ("server" for short) 102, buyer computers 122, 124, supplier computers 126, 128, and an external data source 130, which are communicatively coupled directly or indirectly via network 132. The server 100, buyer computers 122, 124, supplier computers 126, 128, external data source 130, and other elements of the system may each comprise an interface compatible with the network 132 and are programmed or configured to use standardized protocols for communication across the networks such as TCP/IP, Bluetooth, and higher-layer protocols such as HTTP, TLS, and the like.

Server 100 may be implemented using a server-class computer or other computers having one or more processor cores, co-processors, or other computers. Server 100 may be a physical server computer and/or a virtual server instance stored in a data center, such as through cloud computing.

In an embodiment, the server computer 102 executes supplier value generation instructions 116 and approval chain evaluation instructions 118. The server 102 may also be executing additional code, such as code for a procurement system 112. Although the supplier value generation instructions 116 and approval chain evaluation instructions 118 are shown in FIG. 1 as executing on the server 102 separately from the procurement system 112, the supplier value generation instructions 116 and approval chain evaluation instructions 118 may be a part of computer instructions installed as part of the procurement system 112, as a module or a plug-in to supplement features of the procurement system 112, as a separate instance of executing code on the server 102, an instance of code of the procurement system 112, or any other arrangement depending on the needs of a buyer entity.

The server 102 may generate and transmit alerts, notifications, recommendations and other information generated by the supplier value generation instructions 116, approval chain evaluation instructions 118, and procurement system 112 to the buyer computers 122, 124 and/or supplier computers 126, 128 over the network 132 via the presentation layer 120.

The procurement system 112 may include a transactional database 114 managed by the procurement system 112. The transactional database 114 may include transactional information on one or more supplier entities as well as associated details on the supplier entities. The transactional database 114 may also include, for each supplier entity, one or more records of orders or transactions between the supplier entity and a respective buyer entity.

Although the transactional database is shown in FIG. 1 as encompassed by the procurement system 112, the transactional database 114 may exist separately from the procurement system 112 and/or server 102, and may be accessed via network 132.

Additional computing elements, code or other functional elements that are not shown in FIG. 1 may be provided by the procurement system 112.

The server 102 stores data defining buyer profiles 104 and supplier profiles 106. For example, the server 102 may store authentication data and other tracked data, such as transaction history, catalogs, and user preferences, for users of procurement system 112. While FIG. 1 depicts buyer profiles 104 and seller profiles 108 as separate entities in order to provide a clear example of the elements of different profiles, in an embodiment the system does not categorize profiles as buyer profiles and seller profiles. For example, a profile may act as a buyer in some transactions and a seller in other transactions. Additionally, methods described herein may be executed in transactions that do not involve a sale and/or in transactions where the seller profile includes conditional approval chains and the buyer profile includes buyer rating values.

Buyer profiles 104 may comprise one or more conditional approval chains 106 for a buyer profile. For example, the server computer may store data identifying a conditional approval chain 106 for a profile of a user of the procurement system. A conditional approval chain 106 may include one or more conditions and one or more approval requirements if the condition is satisfied. For example, a conditional approval chain may identify a transaction value and a management hierarchy for approving a transaction with a value over the identified transaction value. In an embodiment, conditional approval chains are stored with data identifying a transaction type. For example, a first conditional approval chain may be created for requisitions while a second conditional approval chain is created for contracts.

Supplier profiles 108 may comprise one or more supplier rating values 110 for a supplier profile. For example, the server computer may store data identifying one or more supplier rating values 110 for a profile of a user of the procurement system. The supplier rating values may include any of a transaction dispute value, a sentiment analysis value, a judicial value, an external ratings value, a risk value, or a health value. Computation of the supplier rating values are described further herein. The values depicted in FIG. 1 are intended to be non-exclusive and the supplier rating values 110 may include additional values not depicted in FIG. 1.

The server 102 is accessible over a network 132 by multiple computing devices, such as supplier computer 126, supplier computer 128, buyer computer 122, and buyer computer 124. Although there are two supplier computers 126, 128 and two buyer computers 122, 124 shown in FIG. 1, any other number of supplier or buyer computers may be registered with the server 102 at any given time. Thus, the elements in FIG. 1 are intended to represent one workable embodiment but are not intended to constrain or limit the number of elements that could be used in other embodiments. In an embodiment, the buyer computer 122 and buyer computer 124 may be restricted to only buyers from a single buying entity. In other words, although more than one buyer computer may be used, only verified users of a single buying entity may access information stored in the procurement system 112 from these computers. Any applicable means of restricting unauthorized users from accessing the procurement system 112 may be used (for example, password and username, two-step authentication, or other means). Further, each of the supplier computer 126 and supplier computer 128 may correspond to one or more supplier entities. For example, the procurement system 112 is accessible by more than one supplier entity, because a buyer entity may choose to source from more than one supplier entity for one or more commodities. Different supplier entities may access the procurement system 112 concurrently or at different times, although information on one supplier entity may be hidden or inaccessible from other supplier entities.

The computing devices such as the buyer computers 122, 124 and supplier computers 126, 128 may comprise a desktop computer, laptop computer, tablet computer, smartphone, or any other type of computing device that allows access to the server 102.

The external data source 130 may be accessed via network 132 by the server 102. The external data source 130 may include information relating to one or more supplier entities as well associated details on the supplier entities. The data from the external data source 130 may be used as input to any of the health score generating instructions 106, alert generating instructions 108, recommendation generating instructions 110, and procurement system 112. Although there is one external data source 130 shown in FIG. 1, any other number of external data sources 130 may be accessed by the server at any given time.

The presentation layer 104 may be programmed or configured for generating electronic pages, alerts, notifications, hyperlinks, recommendations, or application protocol messages to output to the computing devices such as the buyer computers 122, 124 or supplier computers 126, 128. For example, the presentation layer 104 may be programmed to generate dynamic web pages that implement an application as a software-as-a-service (SaaS) application that the buyer computer 122, 124 or supplier computer 126, 128 accesses using a web browser hosted at the computing device.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server 102.

Supplier value generation instructions 116 comprise computer-readable instructions which, when executed by one or more processors of server 102, cause server 102 to generate a supplier value for one or more suppliers. Server 102 may execute supplier value generation instructions 116 periodically, such as once a week, and/or in response to one or more actions, such as a determination that a conditional approval chain that is being evaluated includes a supplier rating value 110 as one of the conditions.

Approval chain evaluation instructions 118 comprise computer-readable instructions which, when executed by one or more processors of server 102, cause server 102 to evaluate one or more conditional approval chains associated with a profile of a user. In an embodiment, server 102 executes approval chain evaluation instructions in response to receiving a request by a buyer computer to perform a transaction through procurement system 112.

Network 132 may be implemented by any medium or mechanism that provides for the exchange of data between the various elements of FIG. 1. Examples of network 132 include, without limitation, a cellular network, communicatively coupled with a data connection to the computing devices over a cellular antenna, one or more Local Area Networks (LANs), one or more Wide Area Networks (WANs), one or more Ethernets or the Internet, or one or more terrestrial, satellite or wireless links, or a combination thereof. For purposes of illustrating a clear example, network 132 is shown as a single element but in practice, network 132 may comprise one or more local area networks, wide area networks, and/or internetworks. The various elements of FIG. 1 may also have direct (wired or wireless) communications links, depending upon a particular implementation.

Conditional Approval Chains

Figure 2:
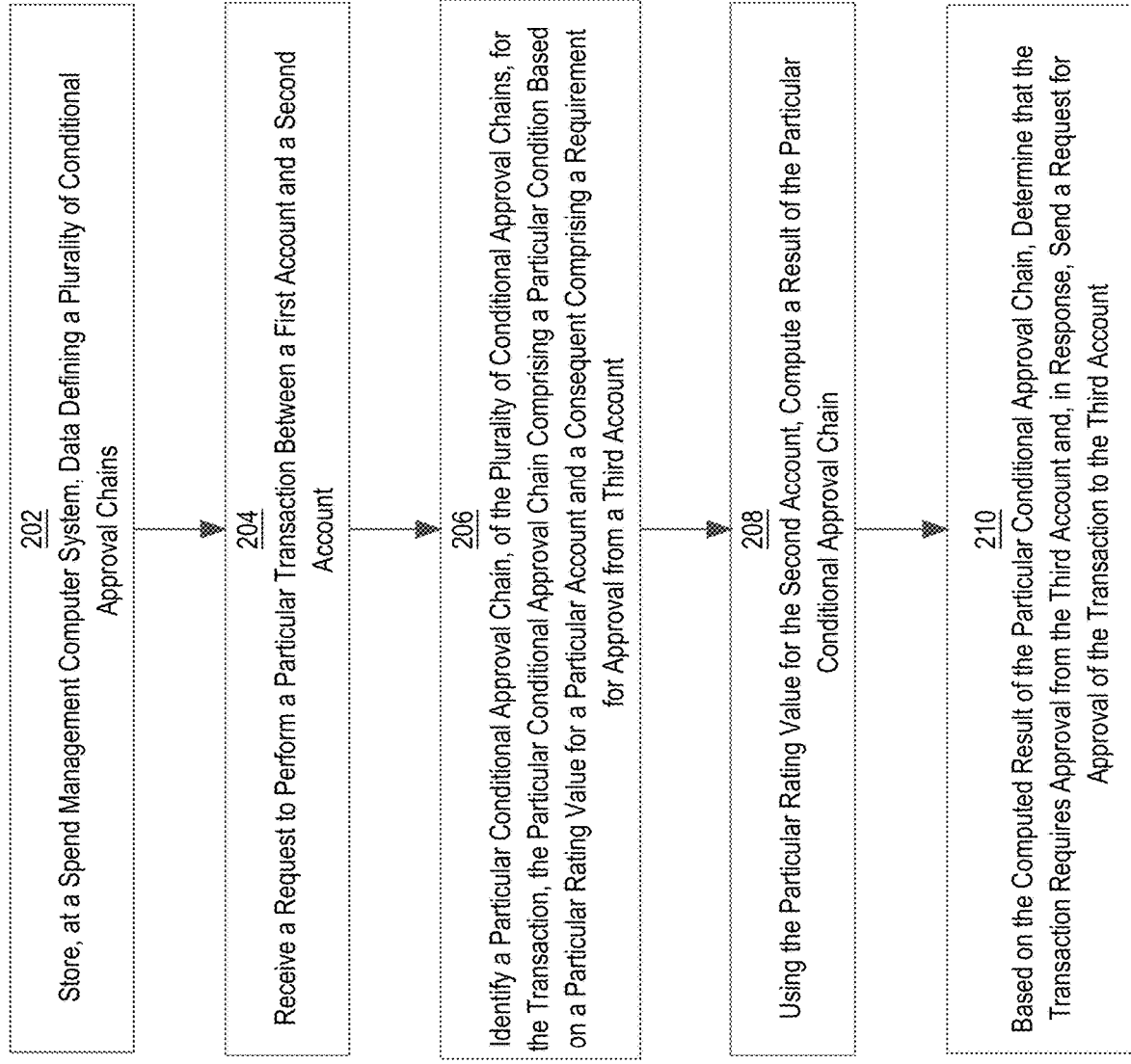
FIG. 2 is a flow diagram that depicts a method of using conditional approval chains to generate a request for approval based on data in a transaction.

FIG. 2 is a flow diagram that depicts a method of using conditional approval chains to generate a request for approval based on data in a transaction.

At step 202, data defining a plurality of conditional approval chains is stored at a spend management system. For example, server 102 provides the procurement system 112 through which the server 102 facilitates transactions between a plurality of computing systems. Server 102 additionally stores conditional approval chains 106 which can be evaluated during processing of a transaction. By storing the conditional approval chains at the spend management system, the methods described herein allow the conditional approval chains to be automatically applied to relevant transactions during the facilitation of the transactions.

In an embodiment, the conditional approval chains are transaction specific approval chains. For example, the server 102 may facilitate a plurality of transactions, including contractual arrangements, invoice payment, and requisition services. The server computer 102 may store transactional chains for a customer for different types of transactions. For example, the server 102 may store a first approval chain for contracts and a second approval chain for requisitions for a specific customer. When a customer attempts to enter into a contract through the procurement system, the server 102 may analyze the first approval chain. When the customer attempts to perform a requisition, the server 102 may analyze the second approval chain.

Figure 3:
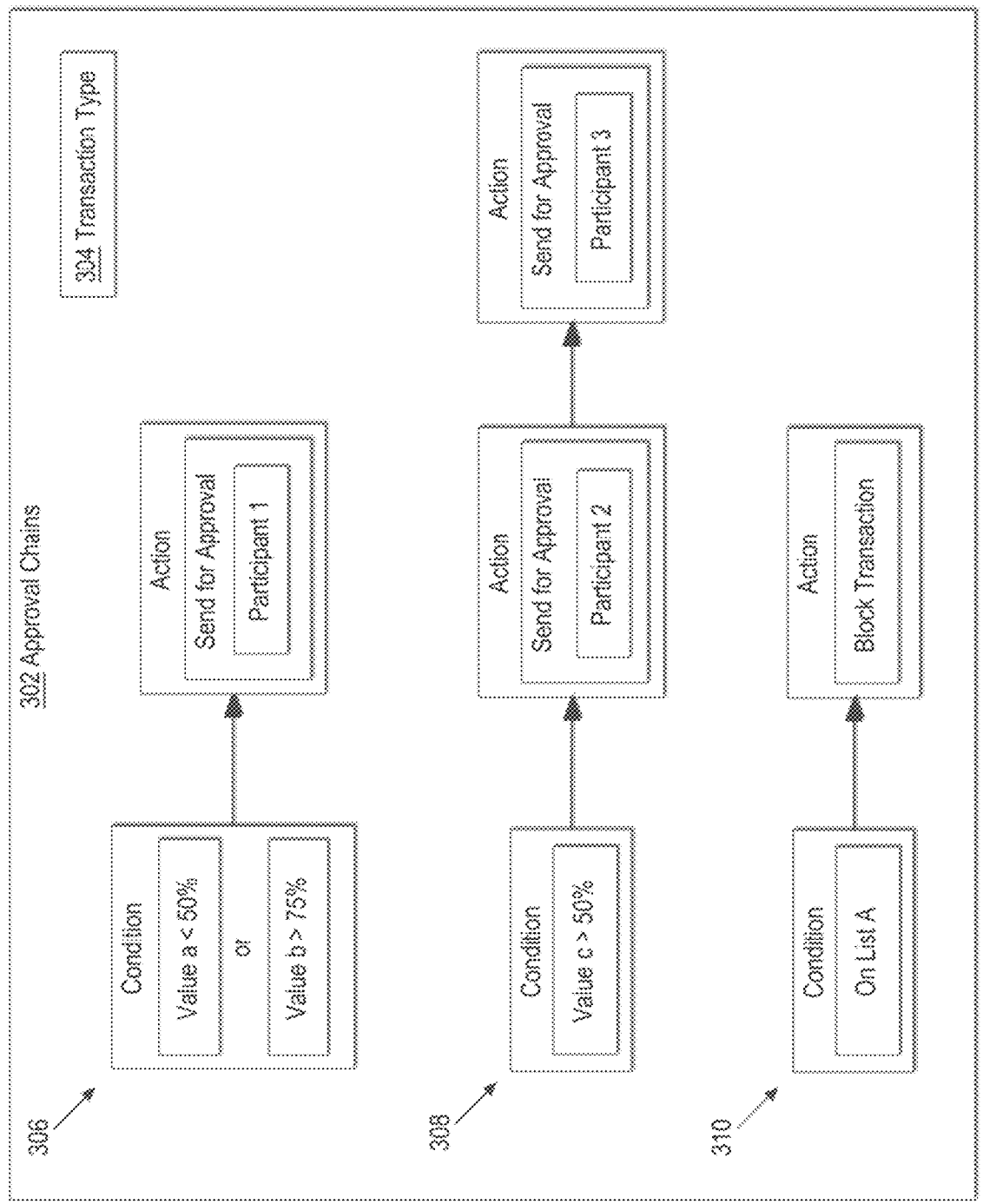
FIG. 3 depicts example conditional approval chains.

Conditional approval chains, as used herein, refer to stored functional logic elements which determine consequents based on conditions. A consequent, as used herein, refers to an action that is performed in response to a condition being satisfied. FIG. 3 depicts example conditional approval chains. In FIG. 3, approval chains 302 have been defined for transaction type 304. As noted above, approval chains may vary depending on a transaction type. Additionally and/or alternatively, some approval chains may be generated for transactions of a plurality of types.

Approval chain 306 comprises a disjunctive condition and a requirement for approval action. The condition of approval chain 306 is satisfied if one of "value a<50%" or "value b>75%" is true. If either of the conditions are satisfied, the system performs the action. In the case of approval chain 406, the action comprises sending the transaction to participant 1 for approval. In an embodiment, the spend management system does not allow the transaction to continue until authorization is received from the approver. Thus, until the spend management system receives approval from Participant 1, the transaction from which approval chain 306 was executed may not be completed. Thus, by integrating the approval chain into the spend management system, the system is able to facilitate transactions while allowing other participants to set controls which limit the types of transactions that can be performed without approval.

Approval chain 308 comprises a condition, a first action, and a second action. Specifically, approval chain 308 requires approval of two different participants prior to completion of the transaction. The system may initially determine whether the first condition has been satisfied, i.e. value c>50%. If the first condition is satisfied, the system sends data identifying the transaction to Participant 2 with a request for approval. If the system receives approval from Participant 2, the system may automatically send data identifying the transaction to Participant 3 with a request for approval. The request sent to Participant 3 may additionally include data identifying the approval from Participant 2.

Approval chain 308 represents an example of an approval chain where the spend management system is able to incorporate a plurality of approvers in series, thereby automatically sending data identifying the transaction to each approver prior to completion of the transaction. While approval chain 308 depicts conjunctive approval requirements where both Participant 2 and Participant 3 must approve the transaction for the system to proceed with the transaction, other embodiments may incorporate disjunctive approval requirements wherein only a subset of a plurality of participants must approve the transaction for the system to proceed with the transaction. For example, the system may require approval from one of Participant 2 or Participant 3.

Approval chain 310 comprises a condition based on a status of a party in the transaction and an action to be performed. In approval chain 310, the condition is whether the party to the transaction appears on a particular list, List A. If the party to the transaction appears on List A, the transaction is automatically blocked from proceeding. Approval chain 310 is an example of an approval chain wherein satisfaction of the condition causes the transaction to be blocked, instead of providing actions for eventual approval of the transaction. In some embodiments, a user may request an override of a blocked transaction, thereby causing data identifying the transaction to be sent to one or more participants for approval.

Other options for actions to be performed in response to satisfaction of a condition include generating a submission warning and/or adding watchers to the transaction. In the generated submission warning option, the warning may indicate a condition that was satisfied which caused the warning to be generated, such as the supplier value which was below the threshold. Adding watchers may include identifying other users to be notified about the transaction and who may review the transaction but are not required to approve the transaction.

Referring again to FIG. 2, at step 204, a request is received to perform a particular transaction between a first account and a second account. For example, the spend management computer system may facilitate a transaction between two accounts. The transactions may include contractual agreements, purchases, requisitions, sourcing events, invoice payments, information requests, service/time sheet approval, and/or other transactions between two or more accounts. In the example of a purchase, a user associated with a first account may select an item for purchase from a second account and request completion of the transaction. In this context, "account" may refer to a digitally stored dataset that is manipulated by computer and represents a user, entity, client computer or other computing element; an account may be represented in digital storage in a database using a row in a table, in which the row associates column values for data items such as an account name, password or credentials, role, permissions, and other values.

At step 206, a particular conditional approval chain, of the plurality of conditional approval chains, is identified for the transaction, the particular conditional approval chain comprising a particular condition based on a particular rating value for a particular account and a consequent comprising a requirement for approval from a third account. The spend management computer system may determine which conditional approval chains are associated with the first account. For example, a plurality of accounts may be associated with a particular entity. An administrator for the particular entity may generate conditional approval chains that are to be evaluated when any account and/or a subset of the accounts associated with the particular entity attempt to execute a transaction. Thus, identifying the particular conditional approval chain may comprise identifying an entity associated with the first account and identifying the conditional approval chains associated with the entity.

Selecting conditional approval chains may include identifying approval chains associated with specific users, subsets of users, and/or transaction types. For example, a conditional approval chain may be generated for a particular transaction type and applied to users with a particular level of seniority. When an account attempts to execute a transaction, the spend management computer system may identify the transaction type, the associated entity, and the seniority level of the account. The spend management computer system may then identify each stored conditional approval chain that indicates it is to be applied to accounts with the identified seniority level, associated with the identified entity, and performing a transaction of the identified transaction type.

In an embodiment, the conditional approval chain comprises a particular condition based on a particular rating value for a particular account. For example, a condition may specify a minimum supplier health score for a supplier. Examples of other rating value conditions are described in the conditions section below.

The conditional approval chains may additionally include a consequent comprising a requirement for approval for a third account. For example, if the condition of the conditional approval chain is satisfied, the spend management computer system may be programmed to only complete the transaction after requesting and obtaining approval from an account specified in the approval chain. Examples of other approval consequents are described in the actions section below.

At step 208, the spend management computer system computes a result of the particular conditional approval chain using the particular rating value for the second account. The spend management computer system may retrieve rating values for accounts from data stored in the spend management computer system. For example, the spend management computer system may compute rating values for different accounts based on transaction data, received review data, and/or external data corresponding the different accounts. The spend management computer system may store the rating values with data associating the rating values with the corresponding accounts for which the rating values were computed. The spend management computer system may compute the result of the particular conditional approval chain by determining whether the stored rating value for the second account satisfies the condition for the particular conditional approval chain.

At step 210, based on the computed result of the particular conditional approval chain, the spend management computer system determines that the transaction requires approval from the third account and, in response, sends a request for approval of the transaction to the third account. For example, if the spend management computer system determines that the particular rating value satisfies the condition of the conditional approval chain, the spend management system identifies the required approval accounts in the conditional approval chain. The spend management system then sends data identifying the transaction to the approval accounts with a request for approval of the transaction. In an embodiment, the spend management computer system does not complete the transaction until approval is received from the approval accounts.

Conditions

Conditions for approval chains described above may include any number of factors either separately or in combination. For example, one approval chain may require multiple conditions to be met before the system determines that approval is required while another approval chain only requires one of a plurality of conditions to be met before the system determines that approval is required.

In an embodiment, one or more conditions may be based on information within the transaction. Example conditions based on information within the transaction include, but may not be limited to, total cost conditions, supplier specific conditions, quantity conditions, item specific conditions, or purchaser conditions.

A total cost condition may be a condition based on a total cost of a transaction and/or a total cost of a plurality of transactions. For example, a first conditional approval chain may require approval for any transaction exceeding $5,000 in total cost and a second conditional approval chain may require approval for any transaction that would cause the total cost of all transactions for a single day to exceed $10,000.

Supplier specific conditions may be conditions that are based on the presence and/or absence of specific named suppliers. For example, a conditional approval chain may require approval for all transactions except for transactions with specified suppliers that are known to be trustworthy by the participant who created the conditional approval chain. As an alternate example, a conditional approval chain may require approval for any transactions with specified suppliers that are known to not be trustworthy by the participant who created the conditional approval chain.

Purchaser conditions, similar to supplier specific conditions, may be conditions based on the user requesting the transaction. For example, conditions may be set in a company that specify which users and/or roles may perform different levels of transactions. Thus, different approval chains may activate depending on which participant in a company is performing the transaction.

Quantity conditions and item specific conditions may be conditions that are based on data in the transaction aside from the participants. Quantity conditions may be conditions based on a quantity of goods purchased. For example, a quantity condition may be "quantity of computers>10." Item specific conditions may include conditions for specific items and/or categories of items. For example, a conditional approval chain may have a first condition identifying specific employees who are only authorized to purchase office materials and a second condition specifying items in the category of "electronics."

Conditional approval chains may additionally include conditions based on values for the suppliers. for example, the spend management system may compute one or more of a financial score, judicial score, new sentiment score, risk score, supplier health score, and/or disputed/rejected invoice score for a plurality of suppliers. When evaluating a conditional approval chain with a condition based on a particular value for the suppliers, the spend management system may determine whether the supplier in the transaction has a particular value that satisfies the condition.

The financial score may include a score that indicates financial stability of the supplier. In an embodiment, the financial score value represents a rating of the supplier based upon financial indicators such as a third-party credit rating score value, a count of previous late payments, and/or a representation of whether the supplier has ever entered bankruptcy. The spend management system may compute a financial score from financial indicators received from external data sources and/or use received financial indicators as financial scores.

In an embodiment, a judicial score value is based upon publicly available legal status databases and represents a number of lawsuits filed against the supplier, such as collections actions. As an example, the spend management system may compute a judicial score as a number of legal actions for the company divided by an average number of legal actions for other suppliers in the system. In an embodiment, the judicial score value is computed from only legal actions where the company is named as a defendant.

In an embodiment, the news sentiment score value represents a sentiment value calculated by third-party sentiment calculation services based upon sentiments expressed in social media postings about the supplier. For example, the supplier may maintain a page in a third-party social networking site and customers may post comments on the page; third-party sentiment analysis software systems are called, using programmatic calls to APIs or the like, to retrieve data indicating the aggregate sentiment of such comments.

News sentiment score values may be received for a plurality of publications and/or from a plurality of third-party sentiment calculation services. For example, news sentiment values may be calculated based on sentiments obtained from a plurality of different social networks and/or media outlets. The news sentiment score values may be stored as separate news sentiment score values and/or combined into a single news sentiment score value. For example, the spend management system may generate an average score from the separate news sentiment score values. The average score may be weighted such that values received from one source are weighted higher than values from a second source. By weighting the values, the spend management system may emphasize news sentiment values from more trustworthy sources and/or from sources that are more likely to correlate to the health of the company.

In an embodiment, the spend management system computes a transaction dispute value based on tracked transaction data for a supplier. For example, the spend management system may provide an interface for indicating disputes, overages, and/or rejections of invoices sent through the procurement system. The system may store dispute data identifying the disputes, overages, and/or rejections of invoices for a supplier in the transactional database. The system may aggregate dispute data for each supplier and use the aggregated dispute data to create a data value indicating a total number of disputes, overages, and rejections for the supplier. The average disputes, overages, and rejections of a particular supplier may be calculated by dividing a sum of the total number of disputes, overages, and rejections for a particular supplier across a plurality of buyers by a sum of the total number of buyers that the particular supplier has transacted with. and stored as a transaction dispute value.

In an embodiment, the spend management system computes a risk score value using the financial score value, the judicial score value, and the news sentiment score value. An example algorithm for computing the risk score value is as follows:

$$R = w_1 f + w_2 j + w_3 n$$

where $w_1$, $w_2$, and $w_3$ are predetermined weights and f, j, and n are the financial score value, judicial score value, and news sentiment score value respectively. In an embodiment, the spend management system may replace the financial score value with a transaction dispute value.

In an embodiment, the spend management system generates a supplier health score using external rating data, internal rating values, and one or more metrics in transaction information for a participant. The external rating data may include data received an outside source and/or generated from data received from an outside source, such as the financial score, judicial score, news sentiment score, and or risk score described herein. The internal rating values may include average ratings of the supplier from other users of the procurement system. The metrics in the transaction information may include disputes, overages, rejections, and or other metrics tracked through prior transactions. As an example, the system may generate a health score as a weighted average of the risk score, average ratings, and dispute score. Other methods for generating a health score are described in U.S. application Ser. No. 15/683,689, filed Aug. 22, 2017, the entire contents of which are incorporated by reference as if fully disclosed herein.

Conditions based on values for the suppliers may include a value identifier, an inequality, and a threshold value. For example, a conditional approval chain may be activated if the condition of "j>15" is satisfied, where j is the judicial score and 15 is the threshold value set for the condition.

In an embodiment, the spend management system stores data identifying whether a supplier is on a screening list. For example, the spend management system may periodically request data from an external data source storing government watch lists. The spend management system may store data for a supplier indicating whether the supplier is listed on the received government watch lists.

While conditions are described above are described individually, multiple conditions may be combined conjunctively or disjunctively through formal logic of the system described further herein. As an example, a first conditional approval chain may include a condition based on the cost of a transaction, the purchaser of the transaction, and a health score of the supplier, such as the following conditions:

if Total Cost>$5000
    AND $role_{buyer}$<Supervisor
    AND health_score<65
    Actions Conditional approval chains additionally comprise actions that are automatically performed by the spend management system when the conditions are satisfied. Actions that are performed by the spend management system may include blocking a transaction, allowing a transaction to continue, displaying a message indicating a risk of the transaction, and/or requesting approval for the transaction. In an embodiment, the spend management system automatically sends an approval request to one or more accounts in response to determining that a condition has been satisfied. Additionally and/or alternatively, the spend management system may cause display of a message indicating that a transaction would require approval with an option to cause the spend management system to request approval and an option to cancel the transaction.

In an embodiment, conditional approval chains may include actions involving requesting approval from any of a plurality of participants. For example, the spend management system may store data identifying roles for a plurality of participants associated with a particular company. A conditional approval chain may specify an action of requesting approval from a participant with a particular role. In response to determining the condition is satisfied, the spend management system may store data indicating that the transaction is awaiting approval from a participant with the particular role. When a participant with the particular role signs into the spend management system, the spend management system may display data identifying the transaction for approval. Roles may include data identifying a department from which approval needs to be generated, such as a management department or legal department.

Approval chains may require approval from a plurality of participants. In an embodiment, the system sends the request for approval to each of the plurality of participants in response to determining the condition has been satisfied in the transaction. Additionally and/or alternatively, the system may initially send the request to a first participant and, in response to receiving approval from the first participant, send the request to a second participant.

Graphical User Interface

In an embodiment, the spend management system provides a graphical user interface for generating conditional approval chains to be evaluated and acted upon by the spend management system. The conditional approval chains may be created for all participants of a group of a plurality of participants. For example, conditional approval chains may be generated for application to all users within a company and/or all users in a specific department in a company. In an embodiment, the graphical user interface includes options for specifying users and/or groups of users to which the conditional approval chains apply.

Figure 4:
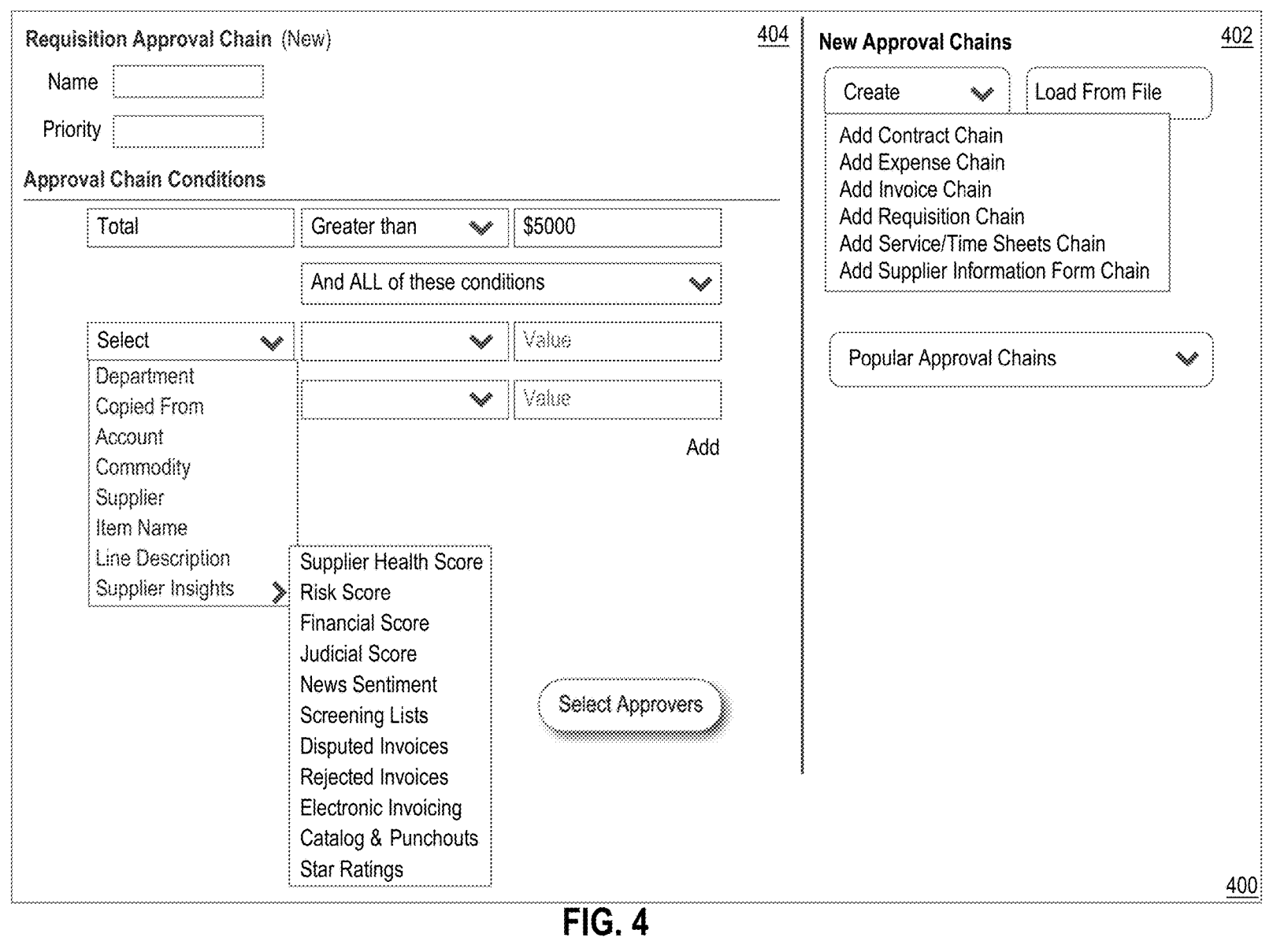

FIG. 4 depicts an example graphical user interface for creating a new approval chain. Graphical user interface 400 comprises new approval chain request 402 and approval chain definition interface 404. New approval chain request 402 comprises options for generating new approval chains. The options include options for generating an empty approval chain, selecting from popular approval chains, and loading approval chains from a file. In the option to generate an empty approval chain, a plurality of options is presented for identifying a type of transaction to which the approval chain would apply, such as expense transactions, invoice transactions, and requisition transactions.

The popular approval chains option comprises an example option for selecting from existing stored approval chains. The stored approval chains may correspond to one or more different business. Selecting from the popular approval chains option may cause display of an existing approval chains with options for customizing the approval requests to a different set of users. In an embodiment, the option for selecting from existing stored approval chains includes options for selecting approval chains generated by the spend management system based on other approval chains in the system. For example, if a plurality of users across different companies use an approval chain for invoices that include a condition of the health score being greater than a threshold value, the spend management system may create an approval chain that includes a condition of the health score being greater than an average of the threshold values used in the approval chains across the plurality of users.

Approval chain definition interface 404 comprises a graphical user with a plurality of options for generating approval chains. Interface 404 is an example interface for creating a requisition approval chain. The interface 404 includes options for inputting a name of the approval chain and a priority of the approval chain. The priority of the approval chain indicates an order in which approval chains will be evaluated and acted upon. For example, an approval chain with a high priority will be evaluated prior to an approval chain with a lower priority.

Interface 404 additionally includes options for selecting approval chain condition. The conditions may include options for selecting a value type, a functional logic type, and/or a threshold value. The first example condition in interface 404 is a condition that the total value of the transaction is greater than $5000. The value type, total, and the functional logic type, greater than, may be selected from a menu, such as the drop-down menu of FIG. 4. The value may be entered into an editable text box in the value field and/or selected from a menu.

Example options for the value type are displayed in a drop-down menu of interface 400. The options allow for the creation of conditions based on a department for the requisition, a location from which the requisition was copied, an account being used for the transaction, a commodity type, a supplier identifier, an item name, information in the line description, and any of a plurality of supplier values, referred to herein as "Supplier Insights", such as health scores, appearance or absence on screening lists, whether the supplier provides electronic invoicing, star ratings, and/or whether the supplier provides catalogs or punchouts. Functional logic components may include equalities and inequalities, such as greater than, less than, includes, equals, or other functional logic.

In an embodiment, interface 400 updates the value field based on a selected value type. For example, if risk score is selected, the value field may be an editable text box for input of a numeric value. If the account value type is selected, the value field may be updated to comprise a drop-down menu with options populated by identifiers of account names associated with the current user profile. For example, the drop-down menu may include identifiers of individuals in a company, positions within the company, and/or financial accounts.

Interface 400 additionally includes options for identifying whether conditions are conjunctive, disjunctive, or a combination of the two. For example, under the first condition is a drop-down menu with the option of "And ALL of these conditions" selected. Other options may include "And ANY of these conditions," "Or ALL of these conditions," and "Or ANY of these conditions." The options allow the user to specify whether multiple conditions must be satisfied or whether a subset of the conditions need to be satisfied. More complex logic may be built by providing the conjunctive/disjunctive logic between each set of conditions, thereby allowing a participant to create an approval chain where the conditions include a first condition or both of a second condition and a third condition.

As an example use of interface 400, a manager may want to define a set of conditions such that transactions above a specific value are sent for approval when the risk score for a supplier is under a particular threshold and the requesting user is lower than a supervisor in the management hierarchy.

The manager may select the options for "Total" and "Greater than" for the first condition and enter the total value of $5000 into the editable text box. The manager may select the option for "And ALL of these conditions." As the second condition, the manager may select the "Account" value type and a "Less than" functional logic type. The interface may then populate a drop-down menu for the value field with roles in the company, from which the manager selects the role of Supervisor. For the third condition, the manager may select the "Risk Score" value type and the "Less than" functional logic type. The manager may then input a value of "85" into the editable value field. In doing so, the manager has now set the conditions for an example approval chain to be when the total value of the transaction is above $5000, the user has a role lower than Supervisor, and the risk score for the supplier is less than 85.

The interface includes options for adding or removing condition rows. Thus, an approval chain may have a single condition, twenty conditions, or any other number of conditions based on the requirements of the user. When all conditions have been selected, the "Select Approvers" option may be selected to transition to an approver selection interface. While FIG. 4 only depicts a "Select Approvers" option as an example, other embodiments may include options for selecting different actions, such as blocking the transaction and/or displaying a warning.

Figure 5:
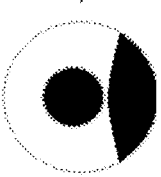
FIG. 5 depicts an example graphical user interface for selecting approvers for a conditional approval chain.

FIG. 5 depicts an example graphical user interface for selecting approvers for a conditional approval chain. While FIG. 5 and FIG. 4 are depicted as separate interfaces, embodiments may include a single interface with the condition defining elements of FIG. 4 and the approver selection elements of FIG. 5.

Graphical user interface 500 comprises an approver display and options for identifying additional approvers. The approver display identifies the created sequence of approvers for a conditional approval chain. Each added approver may be selected for specifying and/or updating. In FIG. 5, the first approver is currently selected. The interface 500 includes the option for defining the approver, such as by entering the name of a different user, a department, a management hierarchy, and/or an approver role. Additionally, the interface 500 includes options for specifying a limit for each approver. For example, a first approver may have an approval limit of $5000. If a request is below the approval limit, the system may skip subsequent approvers after receiving approval from the first approver. If a request is above the approval limit, the system may require approval from one or more subsequent approvers in the approval chain.

FIG. 5 additionally includes options for specifying variations in the conditional approval chain. For example, the first selectable option, if selected, would cause the spend management system to skip an approver when the requester is also the approver. The second selectable option, if selected, would cause the spend management system to skip the requester's management hierarchy for approval if approval is received from all approvers in the conditional approval chain. The third option, if selected, would cause the spend management system to skip all approval chains after the current chain if approval is received.

While FIG. 5 depicts an interface for adding approvers to the transaction, additional embodiments may include options for adding watchers to the transaction. For example, the interface may include an option for selecting whether the added account is a watcher or an approver. Thus, the interface may allow for more nuanced actions in response to determining that conditions are satisfied. For example, the interface may be used to generate a first condition that adds a watcher if a score is below a first threshold value and an approver if the score is below a second threshold value.

Benefits of Certain Embodiments

The methods described herein provide specific improvements in the functioning of spend management systems. By storing conditional approval chains at the spend management system, the spend management system is able to apply the conditional approval chains through the procurement, thereby increasing the efficiency through which requirements for approval are implemented. For example, an approval chain for a particular transaction is capable of being applied as the transaction is performed since the procurement system which facilitates the transaction is also capable of evaluating the conditional approval chain, blocking completion of the transaction, communicating with other computing devices to request approval, and continuing the transaction when approval is received.

The methods described herein additionally improve the manner in which conditional approval chains may be applied. By connecting the conditional approval chain to the spend management system, the methods described herein allow the spend management system to use transactional data from previous transactions to create values that evaluate participants in the transactions. The create values may then be compared to threshold values to determine whether to execute the conditional approval chains. As the conditional approval chains are based on values generated from transactions made through the procurement system, the system is able to continually update the values based on additionally occurring transactions. Thus, the system is able to more efficiently evaluate approval chains with values from the most recent transactions.

Finally, the system described herein provides for improved graphical user interfaces for preparing conditional approval chains for a plurality of users. The graphical user interface allows users to specify the conditional approval chains that work best with their business. By including options for different types of conditions, conjunctive or disjunctive treatment of the conditions, editable threshold values, editable functional logic, and editable approval sequences, the system provides an improved graphical user interface that allows creation of complex approval chains that can be applied to different transactions of different types.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
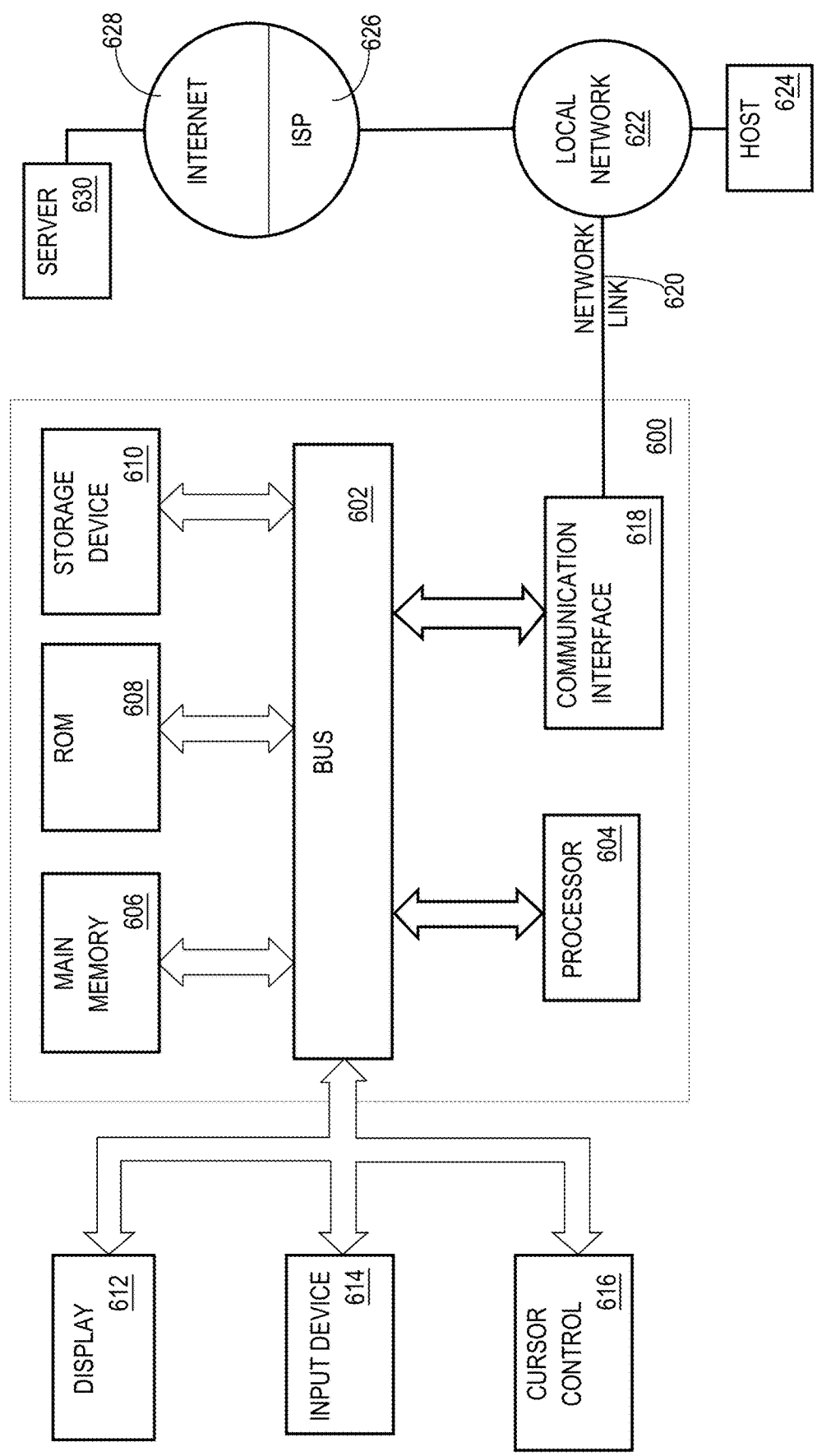
FIG. 6 is a block diagram that illustrates an example computer system with which an embodiment may be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions.

Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method for improving functioning of spend management computer systems through automated evaluation and blocking of transactions, the method comprising, executed at a centralized spend management computer system:

storing a plurality of profiles of a plurality of entity accounts;

for each of the plurality of entity accounts, tracking data of past transactions of the entity account, computing account scores of the entity account based on the data of past transactions, and storing the tracked data and the account scores in one of the plurality of profiles corresponding to the entity account;

storing a first profile defining a plurality of conditional approval chains associated with a first account from among the plurality of entity accounts, the centralized spend management computer system being programmed to complete transactions that require approval according to a particular conditional approval chain of the plurality of conditional approval chains only after requesting and obtaining approval from one or more user accounts associated with the first account that are specified in the conditional approval chain;

each particular conditional approval chain being defined by the spend management computer system receiving, in a graphical approval chain definition interface, a selection of visual graphical options to input a respective priority value, one or more respective status characteristics, a respective condition based on a particular rating value for a particular account and a respective consequent comprising a requirement for approval from a particular user associated with the first account, the graphical approval chain definition interface being programmed to display a value field to receive the particular rating value, to receive a selected value type, and to update the value field from an editable text box to a drop-down menu in response to selection of a different value type;

each of the first account and second account being associated with different client computers, the different client computers being communicatively connected to the centralized spend management computer system;

the centralized spend management computer system being configured to block completion of transactions in response to receiving a transaction, identifying a particular conditional approval chain applicable to the transaction, and computing a result of the particular conditional approval chain using a particular rating value for a second account to yield an evaluated rating value, the evaluated rating value failing the particular condition, to send a request for approval to the particular user account, via dynamic web pages, in response to the evaluated rating value failing the particular condition, and stop blocking completion of transactions when approval is received from the particular user account;

storing a second profile associated with the second account from among the plurality of entity accounts, wherein the second profile comprises records of the second account, values based on the records, and a rating value computed by the centralized spend management computer system based on the values;

receiving, from a first device associated with the first account, a request to execute a first transaction between the first account and the second account;

determining a first type and a first status characteristic of the first transaction;

identifying a first conditional approval chain from among the plurality of conditional approval chains for the transaction based on the first type, the first status characteristic, and the priority of the first conditional approval chain;

retrieving, from the second profile, the rating value for the second account;

computing a result of the first conditional approval chain based on the rating value for the second account;

based on the computed result of the first conditional approval chain, determining, at the centralized spend management computer system, that the first transaction requires approval from a third user account associated with the first account and, in response, performing, at the centralized spend management computer system: sending an alert via the dynamic web pages indicating a risk of the first transaction and that the first transaction requires approval, sending a request via the dynamic web pages for approval of the first transaction to the third user account, and blocking the first device separate from the centralized spend management computer system from completing the first transaction until at least approval of the first transaction is received from the third user account;

updating, based on the first transaction, the rating value for the second account and a rating value for the first account; and displaying, the graphical approval chain definition interface to the third user account, receiving input including at least an updated value type, functional logic type, and/or a threshold value in a drop-down menu and/or editable text box, and updating the rating value of the first conditional approval chain for the second account in response to the input.

2. The method of claim 1, further comprising:
providing via a graphical user interface (GUI) comprising the graphical approval chain definition interface a plurality of selectable condition options and a plurality of approver options, the plurality of selectable condition options comprising options defining different rating values and threshold values for the different rating values;
receiving input, through the GUI, selecting a particular selectable condition option which specifies the particular rating value and a threshold value;
in response to receiving the input, storing the particular conditional approval chain; computing the result of the conditional approval by determining whether the particular rating value satisfies an inequality computation with respect to the threshold value.

3. The method of claim 2, further comprising:
providing, through the GUI, a plurality of selectable transaction type options defining different types of transactions;
receiving input selecting a particular selectable transaction type option specifying a particular transaction type for the particular conditional approval chain;
in response to receiving the request to perform the particular transaction, identifying that the particular transaction is a transaction of the particular transaction type and, in response, identifying the particular conditional approval chain.

4. The method of claim 1, further comprising:
facilitating a plurality of transactions between the second account and a plurality of other accounts;
receiving, for each of a subset of the plurality of transactions, data defining a dispute for the transaction;
computing a transaction dispute value for the second account based, at least in part, on a number of transactions in the subset of the plurality of transactions;
wherein the particular rating value comprises the transaction dispute value.

5. The method of claim 1, further comprising:
requesting, from a judicial record system, data defining a plurality of judicial filings;
identifying a subset of the plurality of judicial filings that identify the second account;
computing a judicial value for the second account based, at least in part, on a number of judicial filings in the subset of the plurality of judicial filings;
wherein the particular rating value comprises the judicial value.

6. The method of claim 1, further comprising:
requesting, from a sentiment analysis system, sentiment analysis data for the second account from one or more media platforms;
computing a sentiment analysis value for the second account based, at least in part, on the sentiment analysis data;
wherein the particular rating value comprises the sentiment analysis value.

7. The method of claim 1, further comprising:
receiving external rating data and profile data for the second account from one or more external data sources;
storing second account rating values for the second account, the second account rating values generated by a plurality of accounts that rated the second account;
storing transaction information for the second account, the transaction information relating to past transactions between the second account and a plurality of other accounts;
calculating a health score value for the second account based, at least in part, on the external rating data, the second account rating values, and one or more metrics in the transaction information for the second account;
wherein the particular rating value comprises the health score value.

8. The method of claim 1, further comprising:
facilitating a plurality of transactions between the second account and a plurality of other accounts;
receiving, for each of a subset of the plurality of transactions, data defining a dispute for the transaction;
computing a transaction dispute value for the second account based, at least in part, on a number of transactions in the subset of the plurality of transactions;
requesting, from a judicial record system, data defining a plurality of judicial filings;
identifying a subset of the plurality of judicial filings that identify the second account;
computing a judicial value for the second account based, at least in part, on a number of judicial filings in the subset of the plurality of judicial filings;
requesting, from a sentiment analysis system, sentiment analysis data for the second account from one or more media platforms;
computing a sentiment analysis value for the second account based, at least in part, on the sentiment analysis data;
computing a risk value for the second account based, at least in part, on the transaction dispute value, the judicial value, and the sentiment analysis value;
wherein the particular rating value comprises the risk value.

9. The method of claim 1, further comprising:
receiving, from an external data source, one or more screening lists identifying a plurality of accounts;
receiving a request to perform a second transaction between the first account and a fourth account;
determining that the fourth account is listed on the one or more screening lists and, in response, denying the request to perform the second transaction.

10. The method of claim 1:
wherein the particular conditional approval chain comprises a second condition based on a second rating value for an account;
wherein computing the result for the particular approval chain comprises determining whether either of the particular condition or the second condition are satisfied.

11. The method of claim 1:
wherein the consequent for the particular conditional approval chain further comprises requirement for approval from a fourth account;
based on the computed result of the particular conditional approval chain, determining that the transaction further requires approval from the fourth account and, in response, additionally sending a request for approval of the transaction to a client computing device associated with the fourth account.

12. A spend management computer system for improving functioning of spend management operations through automated evaluation and blocking of transactions, the spend management computer system being centralized in relation to a plurality of entities that conduct transactions via the system and comprising:
one or more processors;
a memory communicatively coupled to the one or more processors storing instructions which, when executed by the one or more processors, cause performance of:
storing a plurality of profiles of a plurality of entity accounts;
for each of the plurality of entity accounts, tracking data of past transactions of the entity account, computing account scores of the entity account based on the data of past transactions, and storing the tracked data and the account scores in one of the plurality of profiles corresponding to the entity account;
storing a first profile defining a plurality of conditional approval chains associated with a first account from among the plurality of entity accounts, the centralized spend management computer system being programmed to complete transactions that require approval according to a particular conditional approval chain of the plurality of conditional approval chains only after requesting and obtaining approval from one or more user accounts associated with the first account that are specified in the conditional approval chain;
each particular conditional approval chain being defined by the spend management computer system receiving, in a graphical approval chain definition interface, a selection of visual graphical options to input a respective priority value, one or more respective status characteristics, a respective condition based on a particular rating value for a particular account and a respective consequent comprising a requirement for approval from a particular user associated with the first account, the graphical approval chain definition interface being programmed to display a value field to receive the particular rating value, to receive a selected value type, and to update the value field from an editable text box to a drop-down menu in response to selection of a different value type;
each of the first account and second account being associated with different client computers, the different client computers being communicatively connected to the centralized spend management computer system;
the centralized spend management computer system being configured to block completion of transactions in response to receiving a transaction, identifying a particular conditional approval chain applicable to the transaction, and computing a result of the particular conditional approval chain using a particular rating value for a second account to yield an evaluated rating value, the evaluated rating value failing the particular condition, to send via dynamic web pages a request for approval to the particular user account in response to the evaluated rating value failing the particular condition, and stop blocking completion of transactions when approval is received from the particular user account;
storing a second profile associated with the second account from among the plurality of entity accounts, wherein the second profile comprises records of the second account, values based on the records, and a rating value computed by the centralized spend management computer system based on the values;

receiving, from a first device associated with the first account, a request to execute a first transaction between the first account and the second account;
determining a first type and a first status characteristic of the first transaction;
identifying a first conditional approval chain from among the plurality of conditional approval chains for the transaction based on the first type, the first status characteristic, and the priority of the first conditional approval chain;
retrieving, from the second profile, the rating value for the second account;
computing a result of the first conditional approval chain based on the rating value for the second account;
based on the computed result of the first conditional approval chain, determining, at the centralized spend management computer system, that the first transaction requires approval from a third user account associated with the first account and, in response, performing, at the centralized spend management computer system: sending via the dynamic web pages an alert indicating a risk of the first transaction and that the first transaction requires approval, sending via the dynamic web pages a request for approval of the first transaction to the third user account, and blocking the first device separate from the centralized spend management computer system from completing the first transaction until at least approval of the first transaction is received from the third user account;
updating, based on the first transaction, the rating value for the second account and a rating value for the first account; and
displaying, the graphical approval chain definition interface to the third user account, receiving input including at least an updated value type, functional logic type, and/or a threshold value in a drop-down menu and/or editable text box, and updating the rating value of the first conditional approval chain for the second account in response to the input.

13. The system of claim 12, wherein the instructions, when executed by the one or more processors, further cause performance of:
providing via a graphical user interface (GUI) comprising the graphical approval chain definition interface a plurality of selectable condition options and a plurality of approver options, the plurality of selectable condition options comprising options defining different rating values and threshold values for the different rating values;
receiving input, through the GUI, selecting a particular selectable condition option which specifies the particular rating value and a threshold value;
in response to receiving the input, storing the particular conditional approval chain;
computing the result of the conditional approval by determining whether the particular rating value satisfies an inequality computation with respect to the threshold value.

14. The system of claim 12, wherein the instructions, when executed by the one or more processors, further cause performance of:
providing, through the GUI, a plurality of selectable transaction type options defining different types of transactions;
receiving input selecting a particular selectable transaction type option specifying a particular transaction type for the particular conditional approval chain;

in response to receiving the request to perform the particular transaction, identifying that the particular transaction is a transaction of the particular transaction type and, in response, identifying the particular conditional approval chain.

15. The system of claim 12, wherein the instructions, when executed by the one or more processors, further cause performance of:
  facilitating a plurality of transactions between the second account and a plurality of other accounts;
  receiving, for each of a subset of the plurality of transactions, data defining a dispute for the transaction;
  computing a transaction dispute value for the second account based, at least in part, on a number of transactions in the subset of the plurality of transactions;
  wherein the particular rating value comprises the transaction dispute value.

16. The system of claim 12, wherein the instructions, when executed by the one or more processors, further cause performance of:
  requesting, from a judicial record system, data defining a plurality of judicial filings;
  identifying a subset of the plurality of judicial filings that identify the second account;
  computing a judicial value for the second account based, at least in part, on a number of judicial filings in the subset of the plurality of judicial filings;
  wherein the particular rating value comprises the judicial value.

17. The system of claim 12, wherein the instructions, when executed by the one or more processors, further cause performance of:
  requesting, from a sentiment analysis system, sentiment analysis data for the second account from one or more media platforms;
  computing a sentiment analysis value for the second account based, at least in part, on the sentiment analysis data;
  wherein the particular rating value comprises the sentiment analysis value.

18. The system of claim 12, wherein the instructions, when executed by the one or more processors, further cause performance of:
  receiving external rating data and profile data for the second account from one or more external data sources;
  storing second account rating values for the second account, the second account rating values generated by a plurality of accounts that rated the second account;
  storing transaction information for the second account, the transaction information relating to past transactions between the second account and a plurality of other accounts;
  calculating a health score value for the second account based, at least in part, on the external rating data, the second account rating values, and one or more metrics in the transaction information for the second account;
  wherein the particular rating value comprises the health score value.

19. The system of claim 12, wherein the instructions, when executed by the one or more processors, further cause performance of:
  facilitating a plurality of transactions between the second account and a plurality of other accounts;
  receiving, for each of a subset of the plurality of transactions, data defining a dispute for the transaction;
  computing a transaction dispute value for the second account based, at least in part, on a number of transactions in the subset of the plurality of transactions;
  requesting, from a judicial record system, data defining a plurality of judicial filings;
  identifying a subset of the plurality of judicial filings that identify the second account;
  computing a judicial value for the second account based, at least in part, on a number of judicial filings in the subset of the plurality of judicial filings;
  requesting, from a sentiment analysis system, sentiment analysis data for the second account from one or more media platforms;
  computing a sentiment analysis value for the second account based, at least in part, on the sentiment analysis data;
  computing a risk value for the second account based, at least in part, on the transaction dispute value, the judicial value, and the sentiment analysis value;
  wherein the particular rating value comprises the risk value.

20. The system of claim 12, wherein the instructions, when executed by the one or more processors, further cause performance of:
  receiving, from an external data source, one or more screening lists identifying a plurality of accounts;
  receiving a request to perform a second transaction between the first account and a fourth account;
  determining that the fourth account is listed on the one or more screening lists and, in response, denying the request to perform the second transaction.

21. The system of claim 12:
  wherein the particular conditional approval chain comprises a second condition based on a second rating value for an account;
  wherein computing the result for the particular approval chain comprises determining whether either of the particular condition or the second condition are satisfied.

22. The system of claim 12:
  wherein the consequent for the particular conditional approval chain further comprises requirement for approval from a fourth account;
  based on the computed result of the particular conditional approval chain, determining that the transaction further requires approval from the fourth account and, in response, additionally sending a request for approval of the transaction to a client computing device associated with the fourth account.

* * * * *